Figure 1:
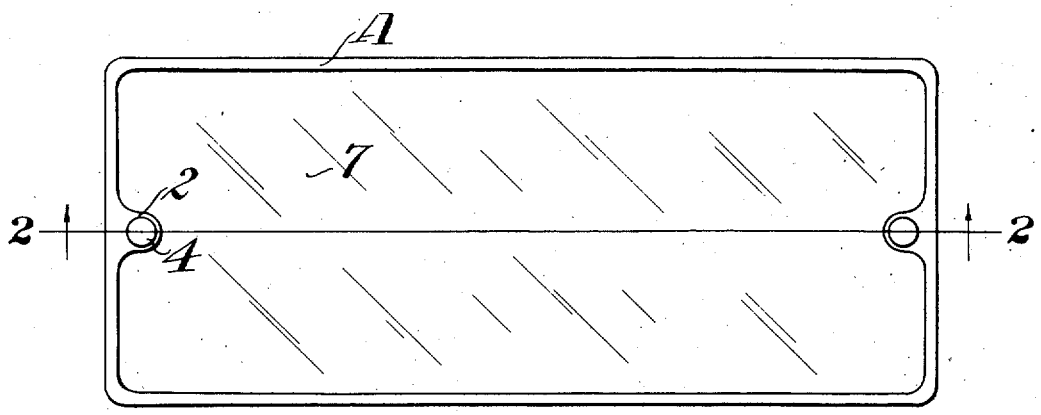

Oct. 7, 1930.

H. H. STEINMAN

ANTIFROST DEVICE FOR WINDOWS

Re. 17,821

Original Filed Feb. 15, 1926

Inventor

Harry H. Steinman

By H. C. Johnson

Attorney

Reissued Oct. 7, 1930 Re. 17,821

UNITED STATES PATENT OFFICE

HARRY H. STEINMAN, OF ST. PAUL, MINNESOTA, ASSIGNOR TO NO FROST CLEAR VISION SHIELD COMPANY, A CORPORATION OF MINNESOTA

ANTIFROST DEVICE FOR WINDOWS

Original No. 1,681,443, dated August 21, 1928, Serial No. 88,306, filed February 15, 1926. Application for reissue filed November 29, 1929. Serial No. 410,399½.

The present invention relates to an antifrost device for a window, as the windshield of an automobile.

An object of the invention is to secure a metal supporting frame for a transparent sheet and a sealing strip in contact with the window, with vacuum cups so connected with the frame as to permit an unbroken contact of an endless sealing strip carried by the frame with the window.

In carrying out my invention in the manner shown in the drawings, I provide a separable frame having a flexible sealing member gripped intermediate the edges of said frame to contact with a surface against which the frame is positioned, and having vacuum cups removably connected to the device for fastening it to a smooth surface, the frame being demountable to permit interchanging a thin transparent sheet positioned therein and inserting other sheets of substantially equal thickness in lieu thereof.

In the construction shown in the drawings, there is provided, in accordance with one feature of the invention, a pair of frame members stamped from thin sheet metal insertible one within the other, and a strip of flexible material, such as rubber, gripped between the edges of said frames. A transparent sheet is positioned intermediate the frames to be gripped thereby, and a pair of vacuum cups are connected to the frames to hold the frames in position and grip the transparent sheet between said frames.

Of essential importance in achieving the function of my invention is the supporting of vacuum cups by a frame in such a manner as to permit an endless sealing strip being carried by the frame with the cups spaced from this sealing strip so as not to interfere with the continuity of the strip, and this I secure by a projecting bracket portion upon each end of the supporting frame, in which bracket portion a vacuum cup is removably mounted.

Figure 2:
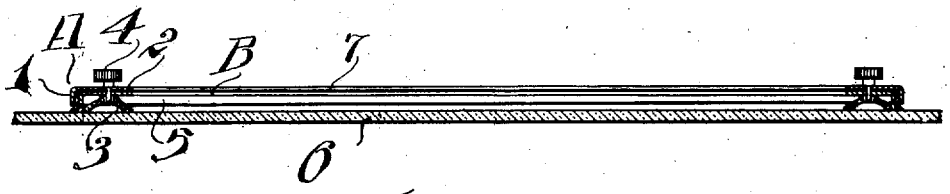

These and other features of the invention, not specifically mentioned, will be more fully brought out in the following description and accompanying drawings, wherein:

Figure 1, is a view in top elevation of the device made in accordance with the present invention; and Figure 2, is a view in section on line 2—2 of Figure 1.

Referring to the drawings in detail, a frame A is formed of sheet metal, such as aluminum, and is provided with a turned down flange 1 surrounding the outer edge thereof. A projection 2 extends inwardly on each side of the frame and is penetrated by a hole, not shown, to receive a vacuum cup 3, having a thumb screw 4 threadedly connected thereto. A second frame B is provided of similar shape and construction and having a central opening corresponding to the central opening in the outer frame A, but having a downturned flange 5 thereof of a size to fit within the downward flange of the outer frame A.

Between the downturned flange 1 of the outer frame and the downturned flange 5 of the inner frame is gripped a strip of suitable flexible material, such as rubber, to extend downwardly below the flanges 1 and 5, to form a seal between the frames, and a plate of glass 6, upon which the device is mounted.

Before the frames are assembled in the positions illustrated, a sheet of celluloid 7, or other suitable material, is inserted between the frames, so that when the frames are drawn to the position illustrated and the thumb screws 4 are turned down to grip the frames tightly, the sheet 7 is gripped firmly between the two frames to hold it in position.

If desired, the transparent sheet 7 may be removed from the frame and replaced by a sheet of amber colored transparent material, not shown, to form a glare shield to protect the eyes of a driver from the glare of approaching headlights, or the rays of the sun, or said transparency may be replaced by a sheet of cardboard, not shown, bearing an advertisement or other desired indicia thereon.

As will be apparent, by having the frame member holding the transparent sheet formed with a downturned flange around its edge, and by forming projecting or bracket portions 2 carried by the ends of the frame in an offset relationship thereto, I am able to secure within the flanged frame a transparent sheet and an endless sealing strip positioned within the flange of the frame so as to present an unbroken and endless contact to the glass, and the cup, being supported by the bracket portion in an offset relationship to the frame, constitute no interference with or breaking of the continuity of the sealing strip. This is of essential importance, as where a vacuum cup, or other securing means, is supported directly underneath the frame there is a necessary breaking of the continuity of the strip, thus interfering with securing an air-closed space inside the frame and between the transparent sheet and glass.

I claim:

1. A device of the character described, comprising a pair of frames insertible one within the other, each of said frames being provided with a downturned flange around the outer edge thereof, a strip of flexible material positioned intermediate said flanges to be held in position thereby, and a pair of vacuum cups removably connected to opposite sides of said frames and having means thereon to draw the frames into proximity with each other to grip a sheet of material between said frames and to hold it in position in said frames.

2. An anti-frost shield, including a frame member having a surrounding downturned flange, a transparent sheet fitted inside the flange of said frame member, a flexible sealing strip secured inside the flange of said frame member entirely around the frame, offset bracket portions carried by the ends of said frame member, and vacuum cups supported by said offset bracket portions, said vacuum cups being spaced from the flange of the frame and the sealing strip, for the purpose set forth.

3. An anti-frost shield, comprising an outer frame, consisting of a narrow strip of metal formed with a downturned surrounding flange, a transparent closing sheet fitted inside the flange of said frame, a sealing strip surrounding the edge of said transparent sheet inside said flange and projecting beyond said flange, means for detachably securing said sealing strip, offset bracket extensions upon opposite ends of said frame, and vacuum cups removably supported by said bracket portions in a position spaced from the flange of said frame and from said sealing strip, for the purpose set forth.

In testimony whereof, I affix my signature.

HARRY H. STEINMAN.